United States Patent
Hong et al.

(12) 
(10) Patent No.: US 11,520,877 B2
(45) Date of Patent: Dec. 6, 2022

(54) RESILIENT MULTI-VARIANT EXECUTION VERIFICATION

(71) Applicant: Raytheon Company, Waltham, MA (US)

(72) Inventors: Patrick W. Hong, Redondo Beach, CA (US); Ben Luc, Cerritos, CA (US); Lizvette Malave, Norwalk, CA (US); Armen Gregorian, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 126 days.

(21) Appl. No.: 16/217,898

(22) Filed: Dec. 12, 2018

(65) Prior Publication Data

US 2020/0193013 A1    Jun. 18, 2020

(51) Int. Cl.
*H04L 29/06* (2006.01)
*G06F 21/52* (2013.01)
(Continued)

(52) U.S. Cl.
CPC ............ *G06F 21/52* (2013.01); *G06F 21/554* (2013.01); *G06F 21/575* (2013.01); *G06F 2221/033* (2013.01)

(58) Field of Classification Search
CPC ... H04L 63/00; G06F 21/00; G06F 2221/033; G06F 21/52; G06F 21/554; G06F 21/575; G06F 21/577; H04B 2201/00
See application file for complete search history.

(56) References Cited

U.S. PATENT DOCUMENTS 10,181,948 B1 *   1/2019   Nenov .................... G06F 8/65
2004/0025022 A1 * 2/2004   Yach ..................... H04L 9/3236
                                                              713/176

(Continued)

OTHER PUBLICATIONS

Chen, Liming, et al., "N-Version Programming: A Fault-Tolerance Approach to Reliability of Software Operation", Proceedings of FTCS-25, vol. III, (1996), 113-119.

(Continued)

*Primary Examiner* — Joseph P Hirl
*Assistant Examiner* — Leynna Truvan
(74) *Attorney, Agent, or Firm* — Schwegman Lundberg & Woessner, P.A.

(57) ABSTRACT

Generally discussed herein are systems, apparatuses, and methods for cyber resiliency. An apparatus can include one or more memory devices including a plurality of instruction sets corresponding to respective application variants stored thereon, one of the application variants including an unmodified version of an application, and one of the application variants including a modified version of the application including the application altered to be resistant to a specified type of cyberattack, processing circuitry to execute the application variants based on a same input, and generate an output, and a monitor to compare output from each of the application variants, and in response to detecting that the output from an application variant of the application variants is not equal to the output from other application variants of the application variants executing a time delayed version of the application variants or restoring the application variants to a known good operating state.

17 Claims, 10 Drawing Sheets

(51) Int. Cl.
*G06F 21/55* (2013.01)
*G06F 21/57* (2013.01)

(56) References Cited

U.S. PATENT DOCUMENTS

| | | | | |
|---|---|---|---|---|
| 2015/0121073 | A1* | 4/2015 | Wajs | G06F 21/16 |
| | | | | 713/168 |
| 2015/0287050 | A1* | 10/2015 | Schmidt | G06Q 30/0201 |
| | | | | 705/7.29 |
| 2017/0068804 | A1* | 3/2017 | Wichmann | G06F 21/602 |
| 2017/0359373 | A1* | 12/2017 | Jaladi | G06F 8/65 |

OTHER PUBLICATIONS

Hosek, Petr, et al., "VARAN the Unbelievable an Efficient N-version Execution Framework", ASPLOS '15, Mar. 14-18, 2015, Istanbul, Turkey, 339-353.
Jackson, Todd, et al., "On the Effectiveness of Multi-Variant Program Execution for Vulnerability Detection and Prevention", MetriSec2010, Sep. 15, 2010, Bolzano-Bozen, Italy, 8 pgs.

* cited by examiner

FIG. 3

```
volatile int global_var
void configure() {
    report("configure")
    ...}
void receive(){
    report("receive")
    op1()
    op2()}
void op1(){
    report("op1")
    ...}
void op2(){
    report("op2")
    ...}
void main(){
    report("main")
    configure();
    while(1)
        receive();}}
```

MATCH:
VARIANT 0: main, configure, receive, op1, op2, receive, op1, op2, ...
...
VARIANT N: main, configure, receive, op1, op2, receive, op1, op2, ...

MISMATCH:
VARIANT 0: main, configure, receive, op1, op2, receive, op1, op2, ...
VARIANT 1: main, configure, receive, op2, op2, receive, op1, op2, ...

SECURITY POLICY 226
PROCESSOR TRACE HARDWARE 220
MONITOR 114
VARIANT 0 108A
VARIANT 1 108B
VARIANT N 108C

RESILIENT MULTI-VARIANT EXECUTION VERIFICATION

GOVERNMENT LICENSE RIGHTS

This invention was made with government support. The government has certain rights in the invention.

TECHNICAL FIELD

Embodiments discussed herein regard devices, systems, and methods for cyber security. Some embodiments include control flow integrity in a multi-variant execution environment.

TECHNICAL BACKGROUND

Cyber resiliency can be defined as the ability to anticipate, withstand, recover from, and adapt to adverse conditions, stresses, attacks, or compromises on cyber resources. Cyber resiliency helps ensure mission survivability in environments vulnerable to or already compromised by cyber attackers. A resilient system can anticipate both known and unknown threat vectors, act to avoid the threat vectors, and minimize the impact of the threat vectors. Cyber resilient techniques strive for service availability and mission survivability in the face of an already compromised system.

The growing complexity of threats and vulnerabilities have put cyber resiliency into sharp focus in the computing world. This is underscored by the National Defense Authorization Act of 2014, which calls for the U.S. Defense Department to explore such cyber resiliency issues. Embodiments herein provide a cyber-resilience using Resilient Multi-Variant Execution Verification (RMVEV).

BRIEF DESCRIPTION OF THE DRAWINGS

In the drawings, which are not necessarily drawn to scale, like numerals may describe similar components in different views. Like numerals having different letter suffixes may represent different instances of similar components, sometimes called items. The drawings illustrate generally, by way of example, but not by way of limitation, various embodiments discussed in the present document.

FIG. 3 illustrates, by way of example, a diagram of an embodiment of another system for RMVEV that includes a control flow check at a function level.

DESCRIPTION OF EMBODIMENTS

Figure 1:
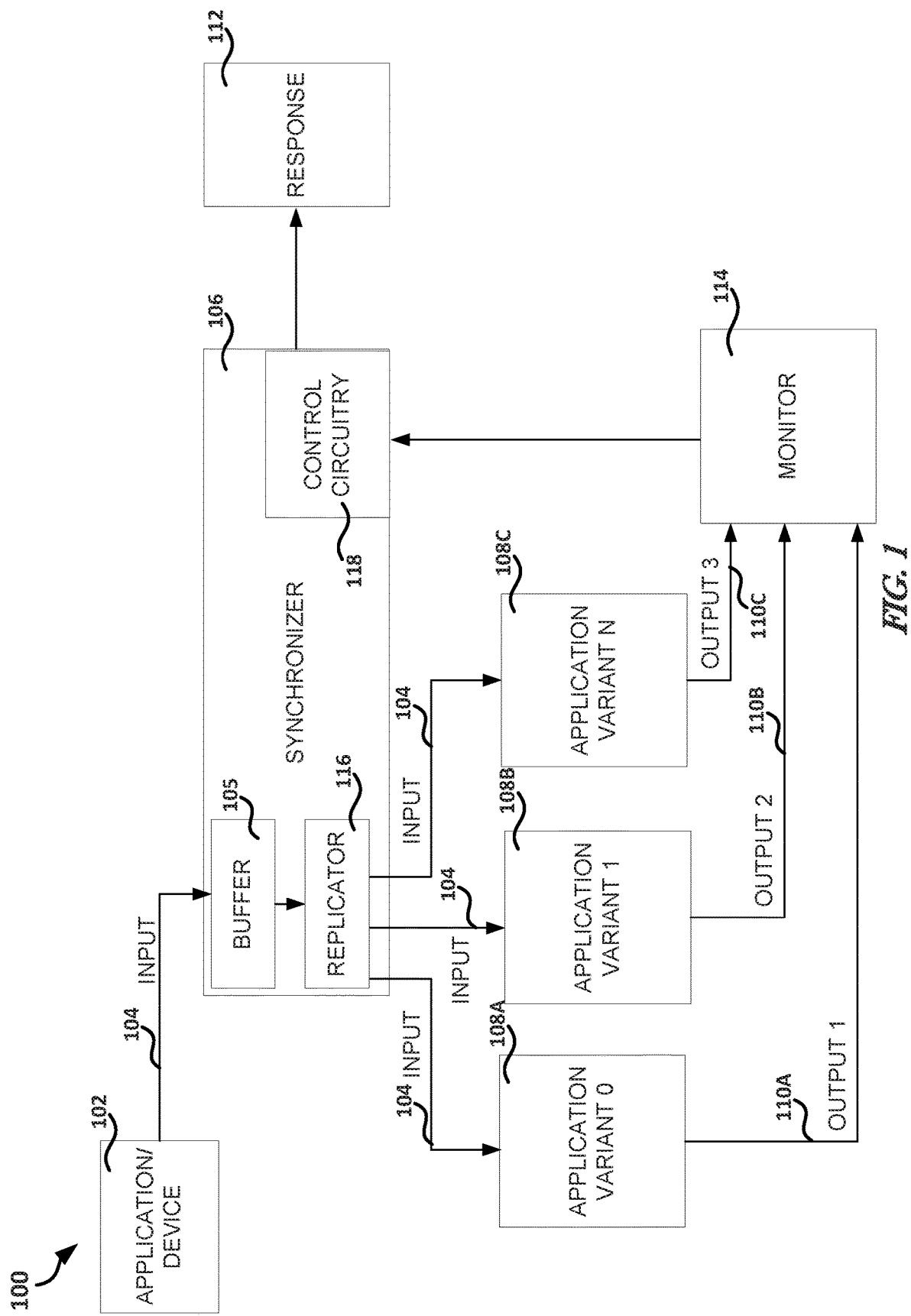
FIG. 1 illustrates, by way of example, a diagram of an embodiment of a system for RMVEV on output of application variants.

Multi-Variant Execution Environment (MVEE) is an existing technique that runs multiple, varied versions (variants) of an application simultaneously and in a synchronous manner. MVEE compares defined parameters of the variants to ensure that no anomalous behavior is occurring. The goal of MVEE is the detection of cyberattacks and, consequently, faults and defects as well. Running diverse variants of the same application amplifies the chance of detecting anomalous behavior indicative of a cyberattack. The variant generation strategy can introduce enough diversity in the variants to make it difficult for an attacker to successfully land an exploit without detection but not so much variation that it introduces benign divergence. Given sufficient variance and sufficient sensor coverage, a successful cyberattack on one variant can fail and be detected on another.

Depending on the variation strategy applied, application operation divergence at a fine granularity of divergence detection may, emerge even in normal non-attack operation of the program, sometimes called benign divergence. This will result in false positives from a monitor that will degrade the functionality of RMVEV. For example, many compiler level transformations used to automate variant generation can introduce these subtle low-level code changes. Accordingly, depending on the granularity of comparison verification, the variation strategy can be chosen carefully to avoid this situation.

An MVEE moderates the inputs and outputs to the variants. Most MVEE environments have a monitor that moderates the inputs/outputs and inspects the variants for mismatch events. The criteria used for the comparison varies amongst MVEE implementations. The criteria for comparison can be important for an MVEE environment to be effective. After an attack is detected, however, MVEE does not inherently solve the issues of maintaining cyber resiliency, namely in availability and restoration.

In some MVEE approaches, after the monitor determines that application operation divergence has been detected, a response is enacted on one or more variants as dictated by security policy. The response is typically to isolate the variants identified as compromised or restart all variants. From a cyber-resiliency point of view, there are shortcomings to these policies:

(1) The policies can attempt to identify and only enact responses on compromised variants. Identifying compromised variants is non-trivial at least because the divergence can manifest in multiple variant subsets containing a varying number of variants. In this case, it is not certain what variants are compromised. In the straightforward case where a lone variant in the set produces a divergent output, it may be that the divergent output is the correct one. Assuming a capability to identify a compromised variant exists, the typical response is to isolate the compromised variant by ignoring its output and halting it. Although this approach preserves cyber resiliency by allowing the remaining variants to continue to run and service requests, there is no guarantee that these remaining variants have not also been compromised by the malicious input in a way that does not manifest itself to the monitor's sensing capabilities. At some level, the remaining variants have already been exposed to malicious input so trusting them to continue processing for the sake of availability is a questionable course of action.

(2) The policies can restart all variants. This stricter policy addresses the uncertainty in identifying compromised variants. Application restart, as a policy, does not address the lack of availability of the service provided by that application during the time it takes to reload and go through its full startup routine. For computationally intensive processes, such as a database server process, this startup time can be substantial and in the order of many seconds or dozens of seconds. Additionally, restarting typically resets all program state, at minimal losing all state and processing that is stored in volatile memory.

RMVEV is an evolution of MVEE that addresses these shortcomings and adds cyber resiliency capabilities through one or more of: (1) Incorporation of a fine-grained comparison technique through control flow integrity with other orthogonal comparison criteria, such as message output comparison; (2) Time delayed execution of variants to ensure that a subset of ready-to-run follower applications can take over the service if the leader subset encounters malicious input; (3) Checkpoint/Restore restoration for fast recovery to maintain high availability of mission critical services; and (4) Malicious input identification for forensics and isolation to filter out future instances of the same malformed data.

RMVEV is an application of an MVEE. The foundation is like MVEE in that variants of the same application run (e.g., lock-stepped) together in a monitored environment. Divergence in the comparison criteria at predetermined synchronization points is indicative of either an attack, fault, or defect and can be reported to a monitor component. The monitor can be an out-of-band process, either in separate hardware or in a separate process. Implementing the monitor in the out-of-band process confers orthogonal cyber protection that provides additional safeguards against a cyber-attacker compromising the monitor as well as the application.

The granularity of the synchronization point is a differentiator for various MVEE approaches. Many MVEEs synchronize at the operating system call level, although the synchronization can be as fine grain as at the instruction level or as coarse grain as at input/output (I/O). The rationale for the system call level is that malicious effects external to the application, such as file corruption or unauthorized network socket communication, are affected through system call interfaces. However, system call synchronization comes at significant costs and complexity regarding developing a supporting kernel module and requires operating system support to enable such monitoring, which may not be available or portable on different platforms. In addition, the security policy of monitoring all system calls can be overly conservative. This is because many system calls simply query the system and cannot affect other running processes or the persistent state of the system to cause harm. Further, only a small subset of sensitive system calls is likely to be useful to an attacker.

To enhance these techniques that focus on externally observable effects, RMVEV can include the fusion of an additional synchronization point: internal control flow comparison. This fusion is sometimes called variant execution verification (VEV).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

RMVEV can apply control flow integrity (CFI) to an MVEE. RMVEV can isolate malicious input. RMVEV can help ensure availability of a service with minimal downtime. RMVEV can stabilize application state after a detected cyberattack. Isolated malicious input can be driven through analysis systems to adapt the service, such as to prevent future attacks. RMVEV can leverage an internal execution state of the variants as comparison criteria. This internal execution criteria can be used in conjunction with other criteria.

RMVEV can provide one or more the following cyber-resilient capabilities: attack detection, adaptation, containment, diversity, forensics support, integrity, isolation, monitoring, non-persistence, randomness and unpredictability, and redundancy. A system incorporating RMVEV can provide cyber resiliency for mission critical, high reliability, or other applications or services. RMVEV can ensure survival of these applications or services after a cyberattack. RMVEV can help an application adapt in real-time to malicious input.

Cyber resiliency techniques have been established through industry consortiums and workshops to be used as engineering design aids for the secure and cyber resilient architectures. Embodiments, sometimes called RMVEV, embody some of these cyber resiliency techniques, which are described next.

(1) Attack detection includes capabilities to detect that an attack or incident is in progress or has occurred; (2) Being adaptive includes changing based on environmental factors and in response to specific events. To practice adaptive attack response is to take actions in response to indications that an attack is underway based on attack characteristics; (3) Containment is a limitation of services, activities or data to a particular area, security zone, subnets, or the like; (4) Diversity includes using a heterogeneous set of technologies (e.g., hardware, software, firmware, protocols, or the like) and vendors. Diversity, whether inherent or artificial, reduces an attack surface of vulnerabilities, minimizing the impact of attacks; (5) Forensics support includes providing execution data for analysis of time before, during, and after a suspected cyberattack or beginning of the phases leading to the attack. Forensics support can seek to understand the cause of past events; (6) Integrity is the capability to ensure that critical services, information stores, information streams, and components have not been corrupted by an adversary; (7) Isolation provides the capability to remove or cut off communications with a particular component or entity. Isolation may be done as a response to a detected attack, loss of trust or other reason. Isolation can be performed as a policy, such as the use of airgaps, or other isolation techniques; (8) Monitoring can be as simple as threshold configuration in a firewall or as complicated as behavioral analysis across systems or services or insider threat behavior indications on a single system. To practice analytic monitoring is to gather and analyze data on an ongoing basis and in a coordinated way to identify potential vulnerabilities, adversary activities, or damage; (9) Non-Persistence includes retention of information, services, or connectivity for a limited time, thereby reducing an adversary's opportunity to exploit vulnerabilities and establish a persistent foothold. Non-Persistence can include refreshing information, services, and connectivity to known trusted states, and eliminating services, information, and connectivity that are no longer needed. Virtualization makes such refreshment much easier. Non-Persistence can be appropriate when refresh is quick enough not to interfere with mission/business functions; and (10) Unpredictability/Randomness can include making changes frequently, sometimes not just in response to actions by the adversary.

FIG. 1 illustrates, by way of example, a diagram of an embodiment of a system 100 for RMVEV. The system 100 as illustrated includes an application/device 102, a synchronizer 106, application variants 108A, 108B, and 108C, a response 110 (or output), and a monitor 114. The input 104 can include an external effect that can be replicated and buffered by the synchronizer 106. The input 104 can include a signal from an interrupt driven event, file I/O, or message I/O, among others.

The synchronizer 106 is software, hardware, or a combination thereof configured to manage the flow of input 104 to response 112. The synchronizer 106 as illustrated includes a replicator 116 and control circuitry 118. The replicator 116 can include hardware, software, firmware, or a combination thereof. The replicator 116 can receive the input 104 and produce copies of the input 104. The copies of the input 104 can be provided to respective application variants 108A, 108B, and 108C. The input 104 to each of the application variants 108A-108C can be identical.

The application variants 108A-108C include different versions of a single application. Each of the application variants 108A-108C are configured to produce a same output given a same input. Each of the application variants 108A-108C can be configured to be resilient to a different variant of cyberattack. For example, the application variant 108A can be the application without any additions or modifications, the application variant 108B can include the application after an address space layout randomization technique has been applied, and the application variant 108C can include the application configured to grow or shrink a stack in a specified direction. Each of the variants 108A-108C can provide an output 110A, 110B, and 110C, respectively, from operating on the input 104 to a monitor 114. The outputs 110A-110C can be the same or different and are dependent on the input 104 and whether the corresponding variant 108A-108C operates differently based on the input 104.

The monitor 114 can receive the outputs 110A-110C from the application variants 108A-108C. The monitor 114 can determine a response 112 to be provided to the application/device 102. The monitor 114 can compare the outputs 110A-110C and configure the synchronizer 106 (via the control circuitry 118) to provide the response 112. There are many responses 112 that can be provided based on the outputs 110A-110C. Many prior MVEE solutions provide the output 110A-110C that occurs most frequently from the application variants 108A-108C. This can be problematic for an attack that is only detected by one application variant 108C while not being detected by the other application variants 108A-108B. In such a case, the monitor 114 would cause the control circuitry 118 to provide an output from a malicious input, thus possibly furthering the malicious attack. Improved solutions are provided regarding embodiments.

As shown in FIG. 1 modifications to external components (e.g., application, device, or the like) via an input can be used as a synchronization point. The synchronizer 106 can support the management and buffering, by the buffer 105, of the input stimuli and the response 112. The synchronizer 106, as previously discussed, can replicate the input 104 and send each input to an associated application variant 108A-108C. The monitor 114 can compare the output 110A-110C to output criteria for equivalence and, assuming equivalence, select one to pass onto the intended receiver as the response 112.

The input 104 and the response 112 can be any number of external effects that can be buffered such as interrupt driven events, file I/O, or message I/O. For simplicity sake, the remainder of this disclosure focuses on message I/O, such as those used by message-oriented middleware that enables high availability applications.

Message-oriented middleware is a software infrastructure that supports sending and receiving messages between distributed systems. This middleware abstracts platform specific details from applications and allows for distributed operation across heterogeneous platforms. Message-oriented middleware can help enable high availability applications.

The monitor 114 can detect and enforce that all application variants 108A-108C send and receive the same response 112 to other components (e.g., hardware, software, firmware, or the like). In some embodiments, the other components will not be aware that multiple application variants 108A-108C are executing. These components can receive only a single copy of the response 112 generated by the target. Similarly, the application variants 108A-108C can be unaware of the presence of other variants. In these embodiments, the input 104 can be replicated to each application variant 108A-108C independently. This allows for a high degree of isolation between (1) the application variants 108A-108C and (2) the target and other components in the system. The isolation can be provided even if those other components are subject to MVEE management.

In some embodiments, the input 104 to each application variant 108A-108C can be identical. Such embodiments make it very difficult for an attacker to send individual malicious inputs to different application variants 108A-108C and compromise them individually. In some embodiments, the synchronizer 106 may store and retain input 104 in a buffer 105. The buffer 105 is a memory device, such as a queue or other memory device that stores data. The buffer 105 can store a sliding window of input 104. The buffer 105 can support restoration operations.

An advantage of an external output synchronization approach implemented by the system 100, is that nearly any application can be monitored without requiring special code or linking processes by the developer (such as a creating a buffering mechanism for I/O outputs). A disadvantage is that the RMVEV does not allow control or monitoring of resources directly accessible by the target application without additional support, so it is coarser.

Embodiments can include control flow comparison for VEV. Control flow comparison provides an orthogonal synchronization point to internal inspection that monitors for internal divergence through control flow comparison at configurable synchronization points. Comparing control flow data of application variants can catch attacks that affect an internal program state but have no outward external observable change. Comparing control flow provides a degree of internal inspection that works synergistically with output synchronization externally to provide heightened sensing of cyberattacks. Control flow comparison is configurable at a variety of levels, such as those regarding FIGS. 2-5. Each of these embodiments includes differing amounts of precision depending on hardware support, impact on the developer, and desired performance impact.

Figure 2:
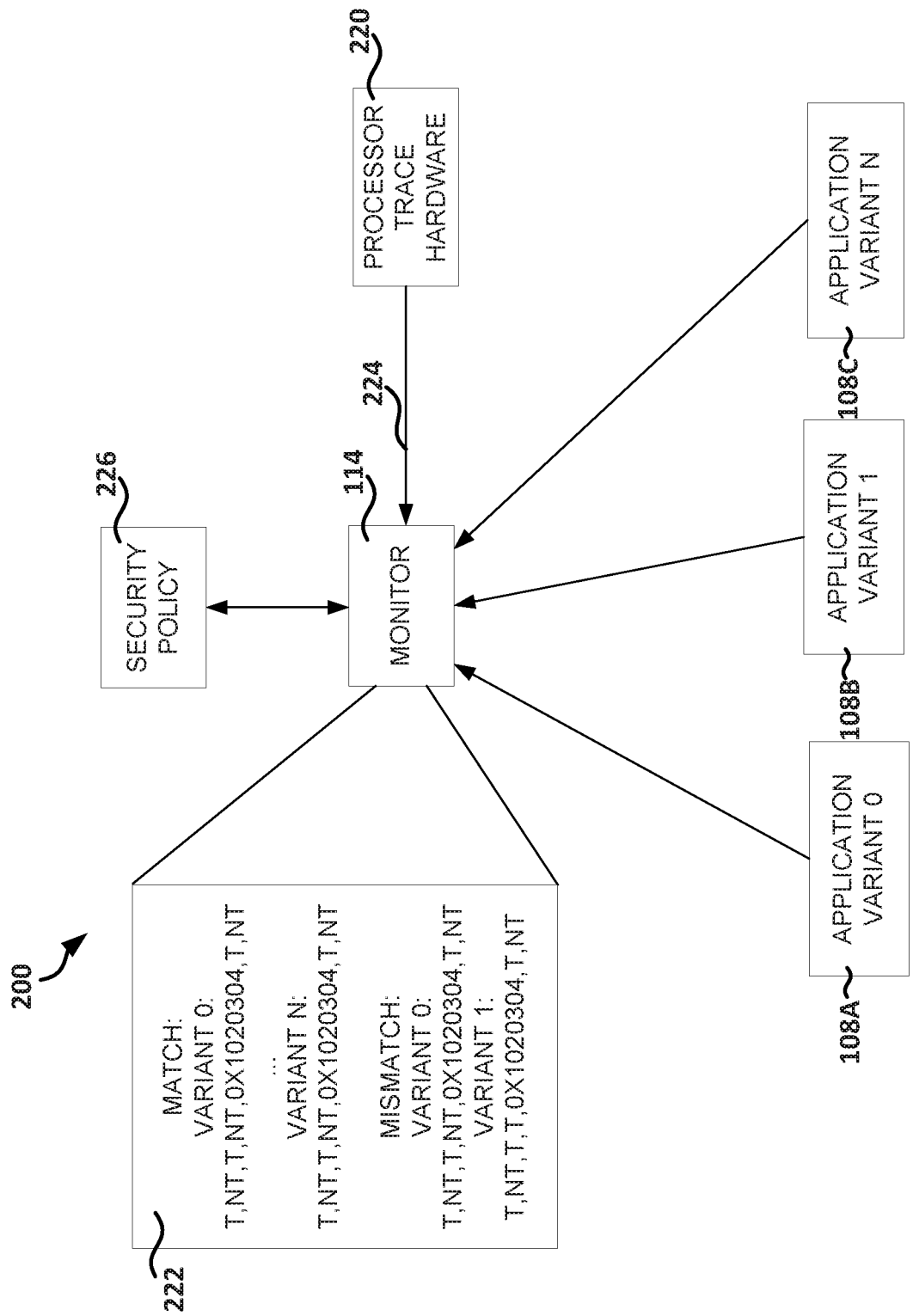
FIG. 2 illustrates, by way of example, a diagram of an embodiment of another system for RMVEV that includes a control flow check at a branch operation.

FIG. 2 illustrates, by way of example, a diagram of an embodiment of another system 200 for RMVEV that includes a control flow check at execution of a branch instruction. The system 200 is like the system 100 with the system 200 including processor trace hardware 220. The system 200 can include the synchronizer 106 in some embodiments, such that the branch level check is used in addition to the output level check of the system 100. The system 200 as illustrated includes the monitor 114, the application variants 108A-108C, and the processor trace hardware 220. Instead of operating at the I/O level, as the system 100 in FIG. 1, the system 200 synchronizes at each branch decision.

The synchronization point in the system 200 is at each branch decision in the application variant 108A-108C. The system 200 provides a finer grain verification as compared to the system 100. Branch processor traces 224 indicate whether a branch was taken (T) or not taken (NT). The branch processor traces 224 can be generated by processor trace hardware 220. A branch corresponds to each point in the application variant 108A-108C where the result of a condition comparison determines whether a branch is taken or not taken. This tracing mechanism can be transparent to the developer.

The processor trace hardware 220 can implement a computer program debugging tool or analysis technique. The processor trace hardware 220 can inform the monitor 114 of the control flow of the application variants 108A-108C. For a particular application variant 108A-108C, at each point where a conditional branch decision is made, the processor trace hardware 220 can record whether that branch was taken or not taken or can provide data to the monitor 114 that can be used to determine whether the brand was taken or not taken. On some modern processors, branch tracing is an abbreviated form of program trace that is supported in the hardware. A code-reuse attack can be detected by a branch divergence.

Code-reuse attacks are common cyberattack techniques that re-purpose existing code segments in the code base. Attackers create functional "gadgets" out of the existing code base and execute chains of gadgets to achieve their malicious goals. To execute a code-reuse attack, an attacker most often diverts the expected, normal execution, also known as control flow, of a program to instead execute code of their choosing. Verifying or preventing control flow from being redirected has been termed CFI. Current MVEEs do not address CFI. RMVEV can use a CFI comparison criterion to provide a fine-grained level of attack detection to a system.

With specifically selected application variants 108A-108C, a cyberattack executing a malicious payload by violating CFI alters the branch characteristics of different application variants 108A-108C in different ways. The monitor 114 can compare the branch traces 222. The branch traces 222 illustrated in FIG. 2 show application variant 108A matching application variant 108C and not matching application variant 108B.

The monitor 114 can perform operations based on a corresponding security policy 226 in response to detecting a divergence (mismatch) in the branch traces 222. Examples of operations that can be taken by the monitor 114 are described regarding FIGS. 5-8. The fine granularity of the branch synchronization point can benefit from application variants 108A-108C that do not alter the branch map of the application variants 108A-108C. Such application variants 108A-108C do not introduce benign divergence. For example, Address Space Layout Randomization (ASLR) is an application variant generation strategy that does not introduce benign divergence at the branch instruction level. A compiler-oriented application variant strategy, however, can introduce benign divergence.

FIG. 3 illustrates, by way of example, a diagram of an embodiment of another system 300 for RMVEV that includes a control flow check at a function level. The system 300 is like the system 200 with the system 300 including processor trace hardware 220 that monitors at a function level rather than a branch level. The system 300 can include the synchronizer 106 in some embodiments. The system 300 as illustrated includes the monitor 114, the application variants 108A-108C, example program code 326, and function monitoring 328. Instead of synchronizing at the branch level as the system 200 in FIG. 2, the system 300 synchronizes at each function call.

The synchronization point in the system 300 is at a transition from one function to another function. A function in program code 326 can include multiple branches, so the system 300 likely performs fewer consistency checks on the application variants 108A-108C than branch level synchronization that is provided in FIG. 2.

Monitoring systems have been proposed that decompose an application into a plurality of states. The valid transitions from state-to-state are configured by the developer and are used in runtime monitoring. Such approaches generally embed the reporting of state transitions in the program code 326 either manually, by the developer, or through automation. The channel used to relay the trace information 328 to the monitor 114 can include a file write, a log write, I/O bus message, or the like. Each of these channels include performance and cost tradeoffs (in terms of compute resources consumed). The channel can be assumed to be the same channel as the message output channel over which the response 112 is provided.

For the system 300, each function represents a state. The developer is required to modify each function in the computer program to report its unique state to the monitor 114 (or some intermediary) either through manual or automated means. A cyberattack executing a malicious payload by violating control flow integrity can be caught by such a function synchronization. The malicious payload can alter the function transitions 330 of different application variants 108A-108C in different ways. The monitor 114 can compare these function transitions 330 and identify any inconsistencies from the application variants 108A-108C. The monitor 114 can determine an operation to perform based on the security policy 226, such as in response to a detecting a divergence (inconsistency) in the application variants 108A-108C.

Figure 4:
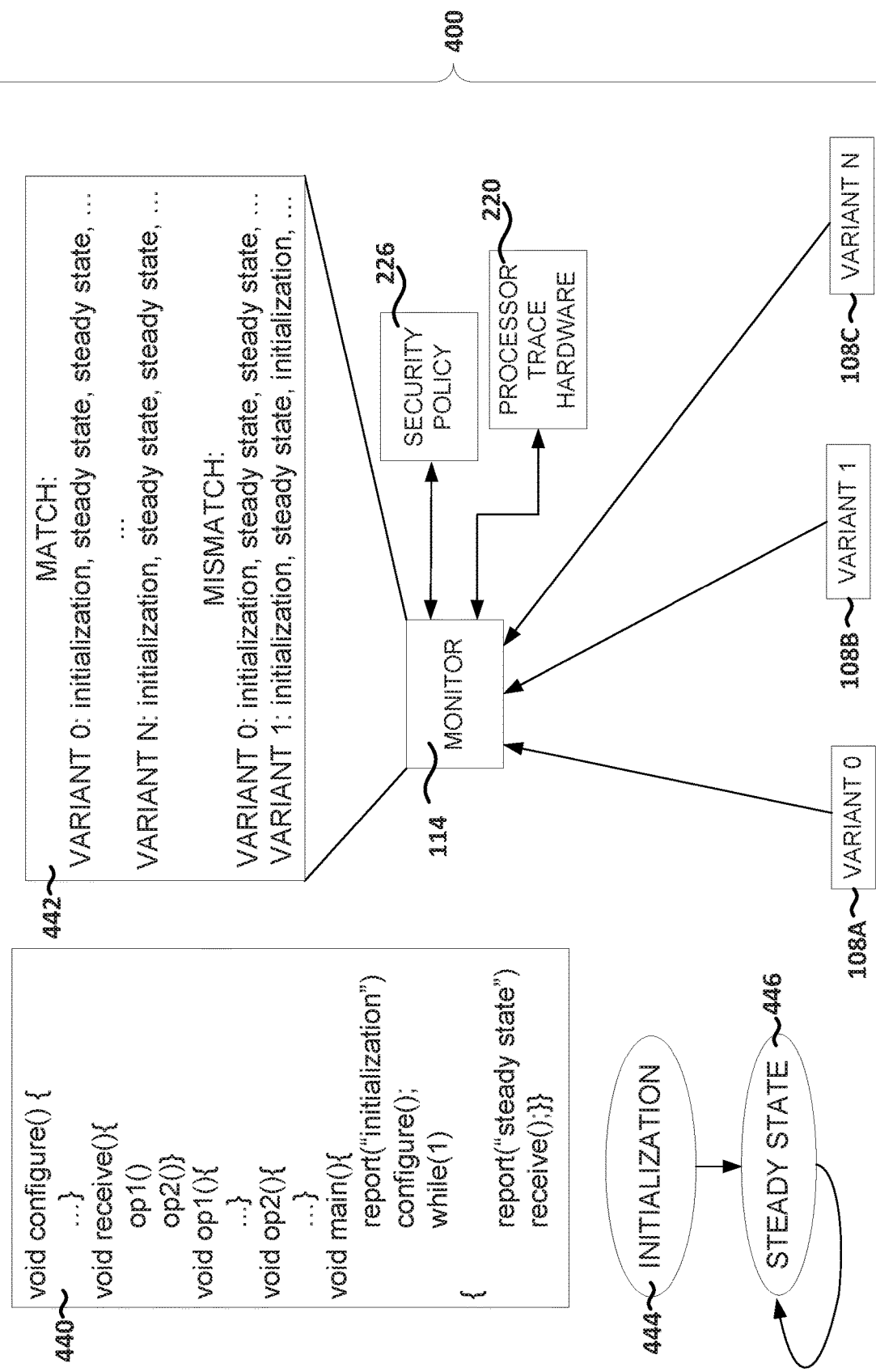
FIG. 4 illustrates, by way of example, a diagram of an embodiment of another system for RMVEV that includes a control flow check at a functional level.

FIG. 4 illustrates, by way of example, a diagram of an embodiment of another system 400 for RMVEV that includes a control flow check at a functional level. The system 400 is like the system 300 with the system 400 including processor trace hardware 220 that monitors at a functional level rather than a function level. Sometimes the functional level is referred to as a state level. The system 400 can include the synchronizer 106 in some embodiments. The system 400 as illustrated includes the monitor 114, the application variants 108A-108C, example program code 440, and functional level monitoring. Instead of synchronizing at the function level as the system 300 in FIG. 3, the system 400 synchronizes at each functional transition.

A state diagram of the program code 440 is provided. The state diagram includes an initialization state 444 and a steady state 446. The initialization state 444 leads to the steady state 446, which leads back to the steady state 446 in a self-loop transition. If the state diagram is violated, such as by entering the initialization state 444 from the steady state 446, the monitor 114 can detect this deviation. The monitor 114 can then determine, based on a corresponding security policy 226, a corresponding operation to perform to help mitigate the threat.

The synchronization point in the system 400 is a high-level functional system state, the initialization state 444 or the steady state 446 in the example of FIG. 4. The states can be defined by a developer. The states can include multiple functions, so the system 400 operates at a coarser level than the systems 200 and 300. The functional system states can include a number of functions, so this approach is the least precise of the approaches described so far and can require more developer involvement. The system 400 can use a similar system state transition reporting and monitoring mechanisms as the previously described function level system 300. A developer or other entity can decompose the program code 440 into a finite state machine representation, where each state includes one or more functions that represent that distinct state.

Instead of reporting state in each function as in the previous method, the state is only reported at these functional state transitions from one state to the next state. These state transitions can be embedded in the computer program code 440 at locations representative of that state.

A cyberattack executing a malicious payload by violating control flow integrity can alter the functional transitions of different variants in different ways. The monitor 114 can compare these functional transitions 442 and act based on the security policy 226 when divergence (a mismatch) is detected.

Figure 5:
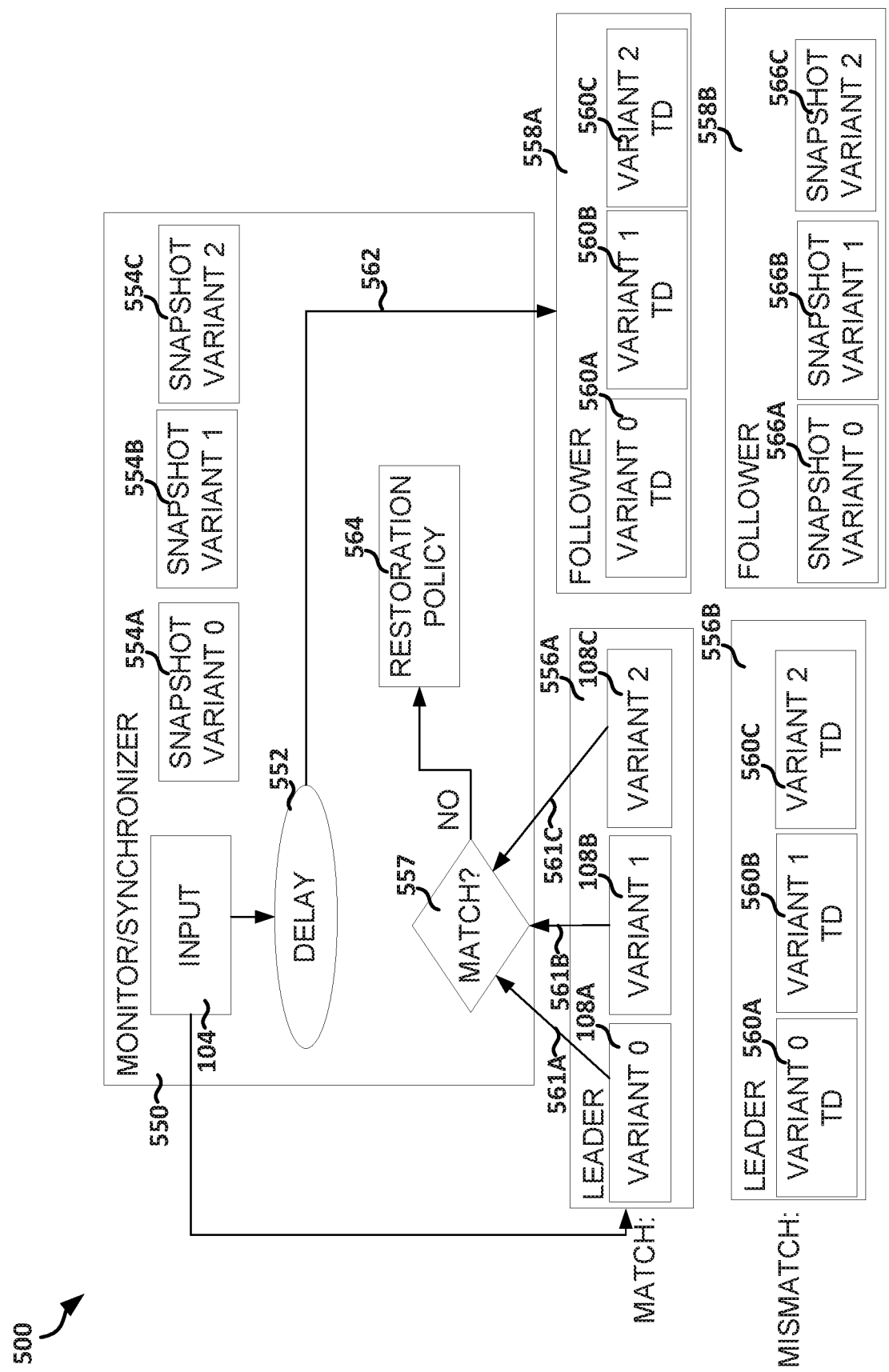
FIG. 5 illustrates, by way of example, a diagram of an embodiment of a system for time delayed hot swap/quick restore.
Figure 6:
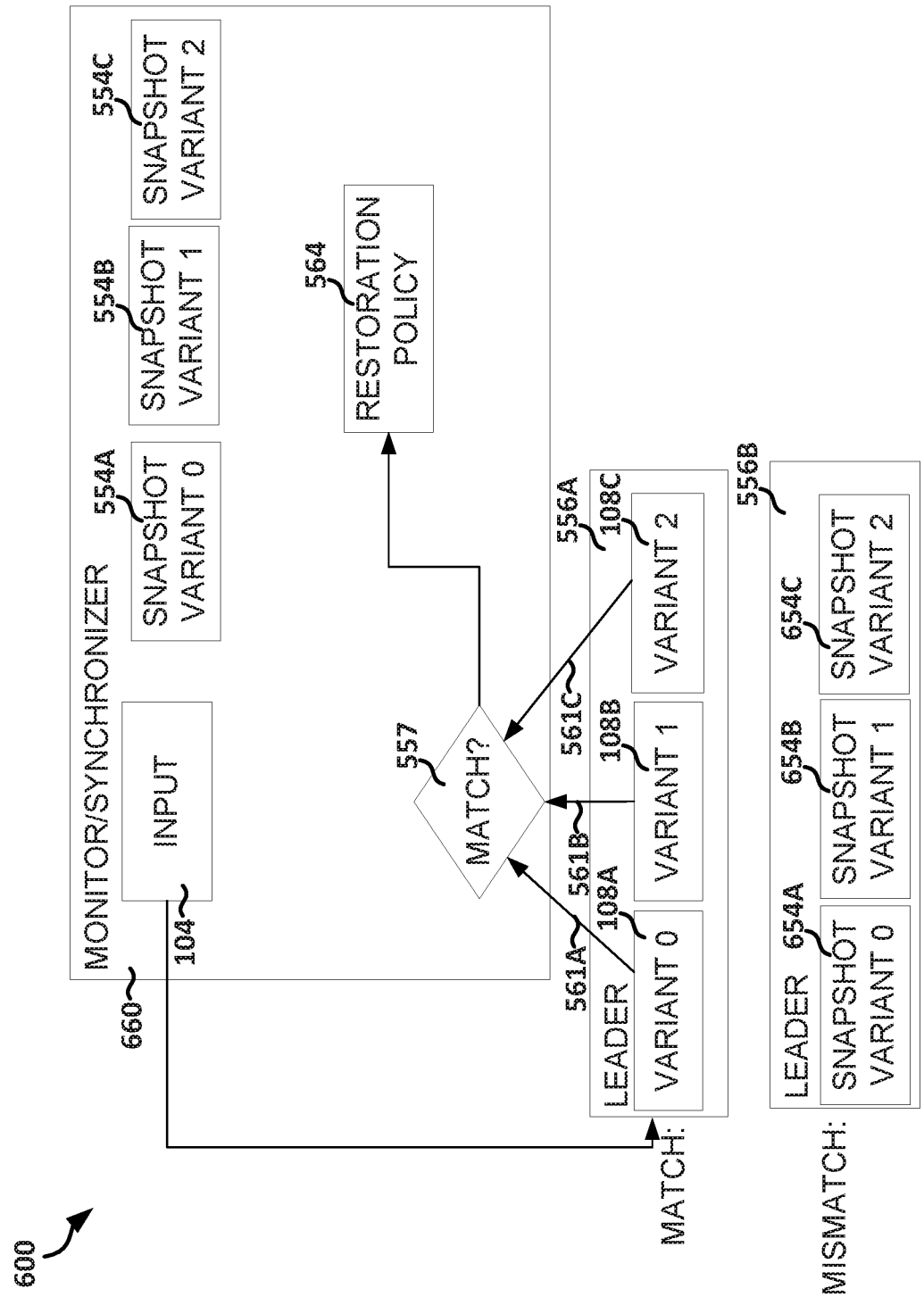
FIG. 6 illustrates, by way of example, a diagram of an embodiment of a system for snapshot/checkpoint restore.

In response to the monitor 114 detecting a potential anomaly (sometimes called a mismatch) among the application variants 108A-108C, embodiments can respond accordingly. The response can address cyber resiliency deficiencies in existing MVEEs. The response can include restoring application variants 108A-108C to a good and known state in a manner that improves operation functionality. Two approaches are proposed in FIGS. 5 and 6. The embodiments of FIGS. 5 and 6 are differentiated by memory overhead and down time. The embodiments are sometimes called time delayed hot swap/quick restore and snapshot/checkpoint restore, respectively. A checkpoint operation saves the state of a running application into a snapshot. A restore operation that may occur at later time resumes its execution from the time at which the snapshot was taken, on the same or a different machine.

FIG. 5 illustrates, by way of example, a diagram of an embodiment of a system 500 for time delayed hot swap/quick restore. The system as illustrated includes a monitor/synchronizer 550, leader application variants 556A, 556B, and follower application variants 558A, 558B. The monitor/synchronizer 550 can include one or more of the monitor 114 and synchronizer 106. The monitor/synchronizer 550 can receive the input 104 and provide a copy of the input 104 to the leader application variants 556A and a delay unit 552. The delay unit 552 can time delay the input 104 and, after the time delay, provide the delayed input 562 to the follower application variants 558A. The follower application variant 558A can include an identical copy of the leader application variant 556A. That is, application variant 560A can be the same program code as application variant 108A, application variant 560B can be the same program code as application variant 108B, and application variant 560C can be the same program code as application variant 108C. The difference is that the application variants 560A-560C have not been provided the input 104, while the application variants 108A-108C have operated on the input 104.

The monitor/synchronizer 550 can receive output 561A, 561B, and 561C from the application variants 108A-108C. The output 561A-561C can include actual output produced by the application variants 108A-108C (see FIG. 1), or processor trace data, such as can be indicative of branches taken or not taken, function calls, or functional transitions of program code as discussed regarding FIGS. 2-4 and provided by processor trace hardware 220.

The monitor/synchronizer 550 can compare the output 561A-561C to determine whether they are the same or different. In response to a determination that the output 561A-561C matches, the follower application variant 558A can be provided the input 104. Thus, the time delay provided by the delay unit 552 can be sufficient to allow the leader application variants 556A to operate on the input 104, provide the output 561A-561C to the monitor/synchronizer 550 and for the monitor/synchronizer 550 to determine whether the outputs 561A-561C match.

In response to a determination that the outputs 561A-561C do not match, the follower application variants 558A, before being provided the time-delayed input 562, can become the leader application variants 556B. In response to a determination that the outputs 561A-561C do not match, the leader application variants 556A can be restored to a known good state (returned to an application variant state of a snapshot 554A, 554B, and 554C), indicated as the snapshot variant 566A-566C. The snapshot variant 566A-566C is a version of the leader application variants 556A after being restored in accord with the snapshot variant data 554A-554C. The snapshot application variants 566A-566C can then be made follower application variants 558B after restoration to a known good state.

In general, application variants 108A-108C are replicated into N number of subsets. For simplicity and sake of explanation, only two subsets, leader application variants 556A-556B and follower application variants 558A-558B are shown in FIG. 5. The input 104 can be provided, at configurable intervals, first into the leader application variant 556A. After configurable time delay, provided by the delay unit 552 to allow the comparison at the defined synchronization points to complete, the input 104 can pass to the follower application variants 558A if all the comparison criteria are met. In this successful comparison case, a checkpoint operation may capture snapshot data 554A, 554B, and 554C that can be used as a restore point in the future, depending on a restoration policy 564. The restoration policy 564 can specify if the snapshots 554A-554C are saved after every time delay or on only a subset of the time delays, such as to allow adjustable processing overhead.

If divergence in the outputs is detected by the monitor/synchronizer 550, then the current leader application variants 556A can be halted. The follower application variants 558A, before receiving the time delayed input 562, can be made the leader application variants 556B. The leader application variants 556B can be provided a next input at the next interval. The former leader application variants 556A, can undergo a restore operation to bring its state back to the most recent snapshot 554A-554C. This process can continue with the leader application variants 556B and follower application variants 558B alternating roles as malicious input is received and detected.

FIG. 6 illustrates, by way of example, a diagram of an embodiment of a system 600 for snapshot/checkpoint restore. The system 600 is like the system 500, but the system 600 forgoes the time-delayed alternate subsets for a checkpoint solution. The system 600 is intended to reduce the processing and memory overhead associated with maintaining follower subsets for environments that have such resource constraints and limitations. This system 600 relies mainly on the inherent speed of the underlying checkpoint technology to provide a fast restoration to a previous known good state. Like the system 500, the input 104 can be provided at configurable intervals to the leader application variants 556A. If all the comparison criteria checks complete and are met by a match checking operation 557, the monitor/synchronizer 660 can capture a snapshot 554A, 554B, and 554C of the application variants 108A-108C, respectively. The snapshot 554A-554C can be used at a restore point in the future. Use of the snapshot 554A-554C can be governed by the restoration policy 564. The restoration policy 564 can specify whether the snapshots 554A-554C are saved after every match or only on a subset of matches (e.g., every two matches, three matches, five matches, ten matches, a greater number of matches, or some number of matches therebetween), such as to reduce processing overhead. If an anomaly is detected by the match operation 557, then the leader application variants 556A can be halted and undergo a restore operation to bring their state back to a snapshot variants 654A-654C based on the snapshot variant data 554A-554C.

By having synchronization points at which the integrity of the application is evaluated, RMVEV can isolate the input 104 that has caused a divergence at the operation 556. The offending input 104 can be flagged as anomalous after the input 104 has been evaluated as bad by the operation 556. Embodiments can use the input data to adapt to future attacks. For example, embodiments can pass the malicious input 104 to a security or audit log to help with forensics and post mortem analysis, pass the malicious input upwards to an intrusion detection system, such as to help identify future attacks, pass the malicious input to an expert system to train the system to detect future malicious inputs, or pass the malicious input to a signature creation engine to create signatures to prevent future attacks. An example of a signature creation engine is provided in FIG. 7.

An intrusion detection system monitors a network or systems for malicious activity or policy violations. The activity or policy violation can be reported to an administrator or aggregated to an event management system to use or distinguish similar future activity from false alarms or prevent future attack. Data analytics is a field of study that incorporates machine learning to correlate multiple sources of information to achieve effective and efficient intrusion detection.

Figure 7:
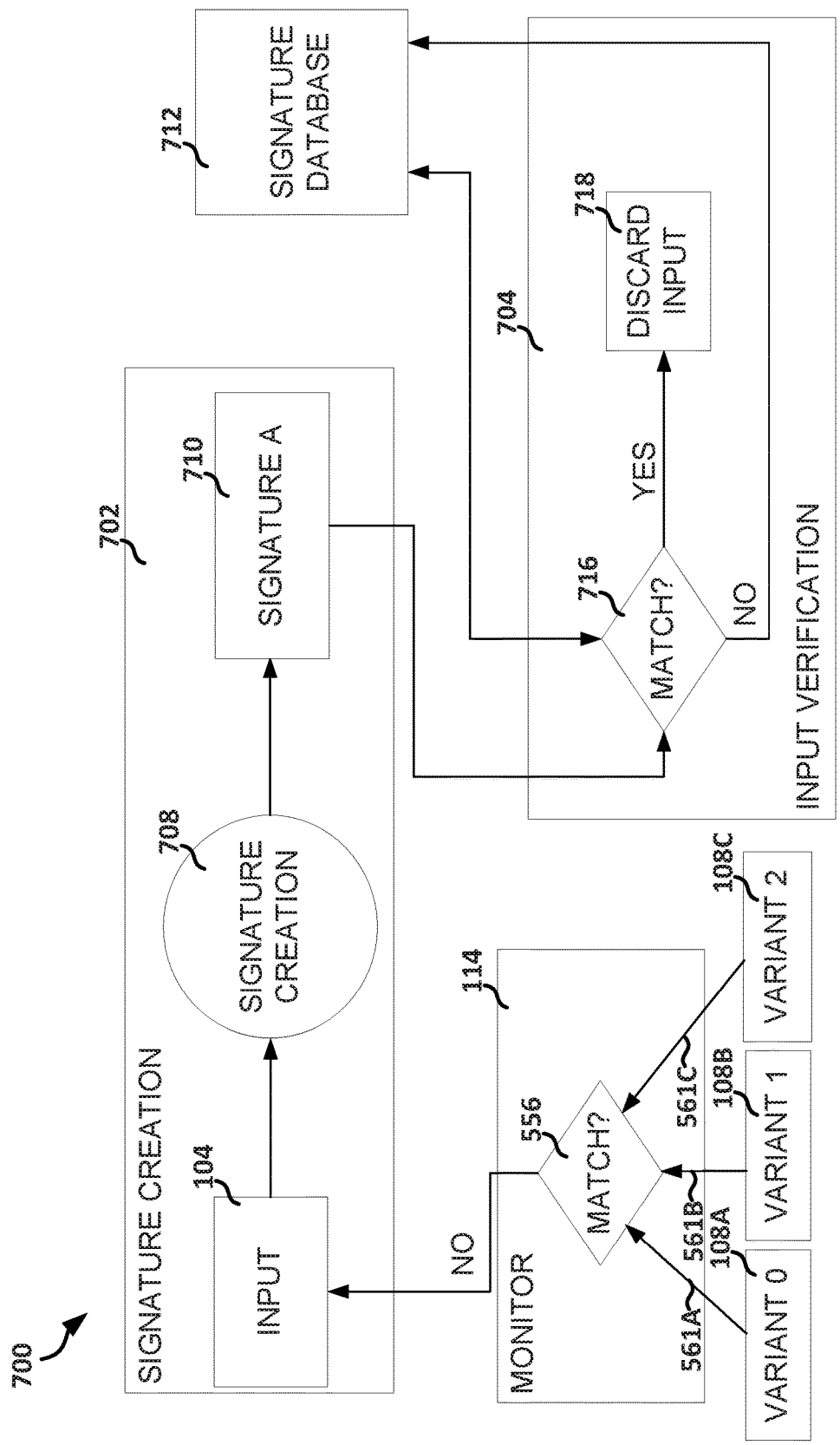
FIG. 7 illustrates, by way of example, a diagram of an embodiment of a system for signature creation and input verification.

FIG. 7 illustrates, by way of example, a diagram of an embodiment of a system 700 for signature creation and input verification. The system 700 as illustrated includes a signature creation system 702, an input verification system 704, a signature database 712, and the monitor 114. The signature creation system 702 as illustrated includes an input 104 from the monitor 114 that generated a violation (a mismatch detected by the operation 557). A signature 710 can be generated at operation 708. The signature 710 can include the input, a hash thereof, or the like.

The input verification system 704 includes the signature 710 provided to the match operation 716. If the match operation 716 detects the signature 710 matches a signature in the database 712, the input verification system 704 can discard the input 706 at operation 718. If the match operation 716 detects the signature 710 does not match a signature in the database 712, the input verification system 704 can provide the signature 710 to the signature database 712.

A similar signature creation and check can be provided between the input 706 and the application variants 108A-108C (FIGS. 1, 5, and 6 illustrate the input 104 being provided to the application variants 108A-108C).

Figure 8:
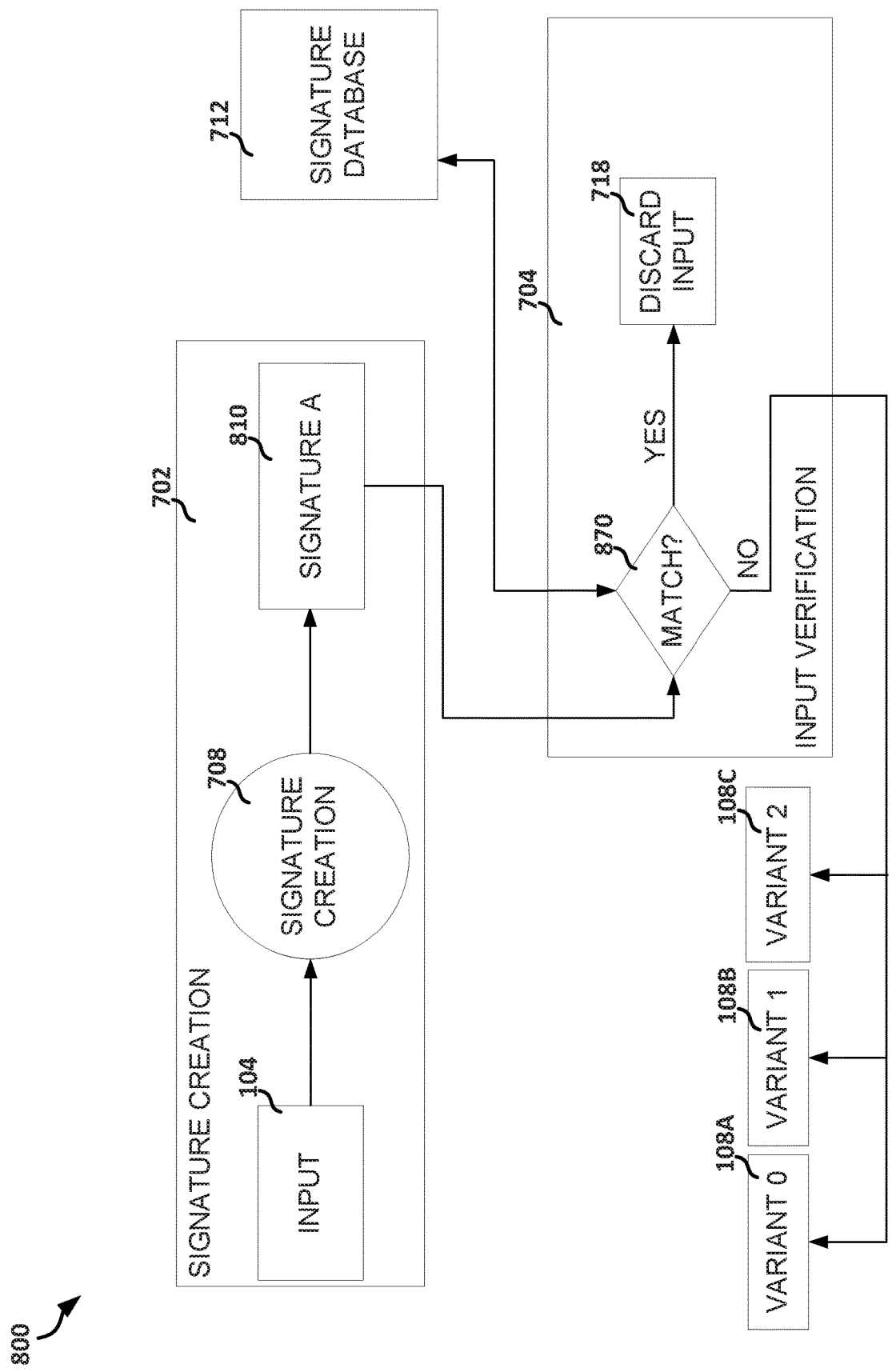
FIG. 8 illustrates, by way of example, a diagram of an embodiment of another system for signature check and input verification.

FIG. 8 illustrates, by way of example, a diagram of an embodiment of another system 800 for signature check and input verification. The system 800 as illustrated includes the signature creation system 702, the input verification system 704, the signature database 712, and the application variants 108A-108C. The input 104 can be used to generate a signature 810, such as by the signature creation operation 708. The signature 810 can be provided to a match operation 870 that compares the signature 810 to signatures in the signature database 712. If the signature 810 matches a signature in the signature database 712, the input 104 can be discarded by operation 718 rather than being operated on by the application variants 108A-108C. If the signature 810 does not match a signature in the signature database 712, the input 104 can be provided to the application variants 108A-108C. Using the system 800, inputs known to be associated with malicious activity (as determined by the system 700) can be filtered before they are provided to the application variants 108A-108C.

The items of the FIGS. 1-8 can be implemented in software, hardware, firmware, or a combination thereof. For example, hardware can include processing circuitry and software can operate on the processing circuitry. The processing circuitry can include a processor (e.g., a central processing unit (CPU), graphics processing unit (GPU), field programmable gate array (FPGA), application specific integrated circuitry (ASIC), or the like) and/or electrical or electronic components (e.g., transistors, resistors, capacitors, diodes, inductors, oscillators, logic gates (e.g., AND, OR, XOR, negate, buffer, or the like), power supplies, regulators, analog to digital converters, digital to analog converters, modulators, demodulators, multiplexers, switches, buck or boost converters, or the like) configured to perform operations of the item. For example, the application/device 102, the synchronizer 106, replicator 116, control circuitry 118, application variants 108A-108C, monitor 114, processor trace hardware 220, delay unit 552, monitor/synchronizer 550, leader application variants 556A-556B, follower application variants 558A-558B, signature creation system 702, or input verification system 704, can be implemented using or operate on the processor or the processing circuitry. Each of the items the application/device 102, the synchronizer 106, replicator 116, control circuitry 118, monitor 114, processor trace hardware 220, delay unit 552, monitor/synchronizer 550, signature creation system 702, or input verification system 704 can be implemented using hardware, software, firmware or a combination thereof.

Figure 9:
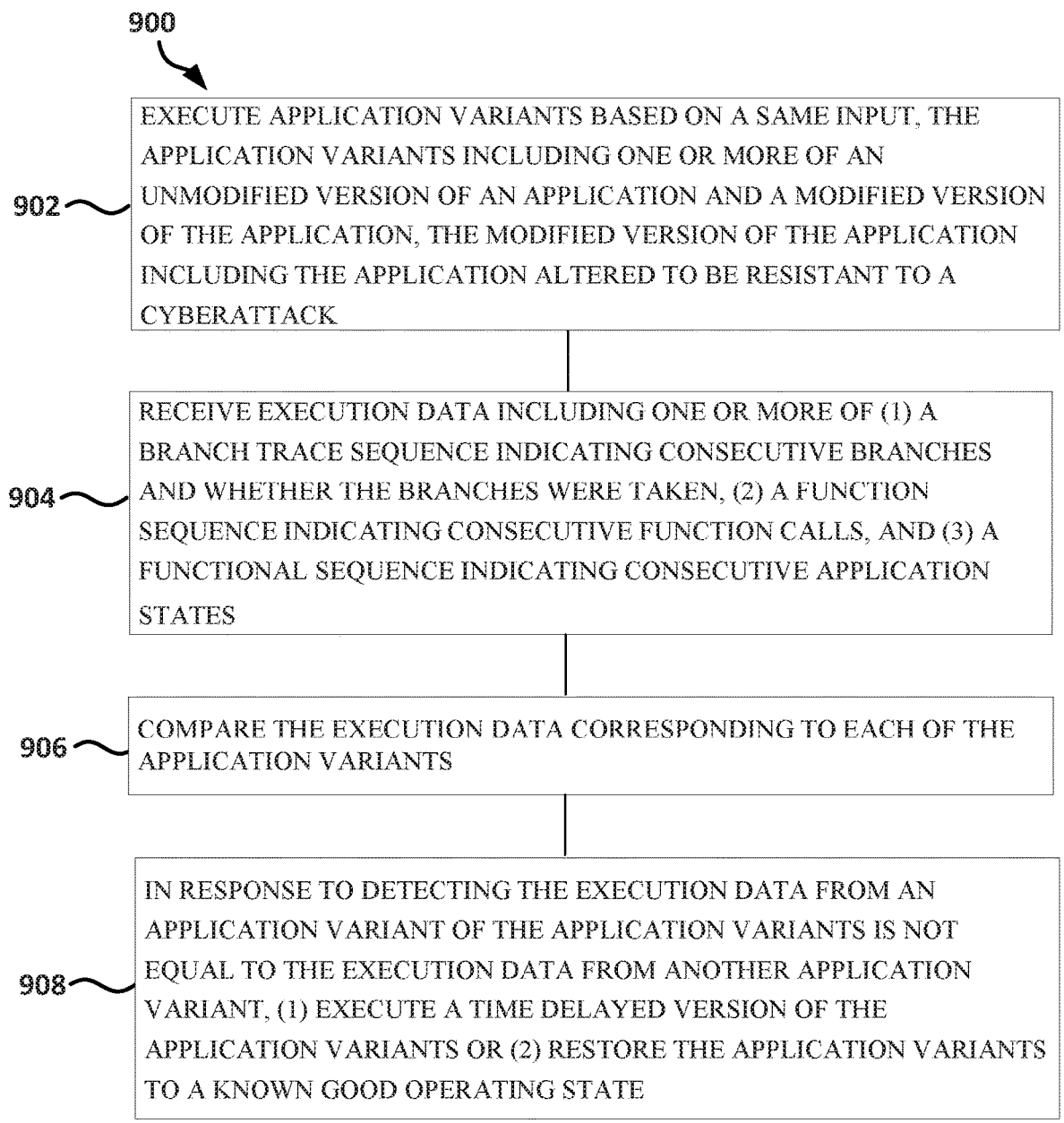
FIG. 9 illustrates, by way of example, a diagram of a method for application cyber resiliency.

FIG. 9 illustrates, by way of example, a diagram of a method 900 for application cyber resiliency. The method 900 as illustrated includes executing one or more application variants 108A-108C based on the same input 104, one of the application variants 108A-108C can include one or more of an unmodified version of an application, and one or more of the application variants 108A-108C including a modified version of the application, the modified version of the application including the application altered to be resistant to a specified type of cyberattack, at operation 902. The method 900 also includes receiving, from processor trace circuitry 220, execution data 224 including one or more of (1) a branch trace sequence indicating consecutive branches and whether the branches were taken, (2) a function sequence indicating consecutive function calls, and (3) a functional sequence indicating consecutive application states, at operation 904. Further, the method 900 includes comparing the execution data 224 corresponding to each of the application variants 108A-108C, at operation 906, and in response to detecting that the execution data 224 from an application variant 108A-108C of the application variants 108A-108C is not equal to the execution data from other application variants 108A-108C of the application variants 108A-108C, (1) executing a time delayed version of the application variants 108A-108C or (2) restoring the application variants 108A-108C to a known good operating state, at operation 908.

The method 900 can further include, where the execution data 224 includes the branch trace sequence, indicating consecutive branches and whether the branches were taken. The method 900 can further include, where the execution data 224 includes the function sequence, indicating consecutive function calls. The method 900 can further include, where the execution data 224 includes the functional sequence, indicating consecutive application states. The method 900 can further include, wherein, in response to detecting that the execution data 224 from the application variant 108A-108C of the application variants 108A-108C is not equal to the execution data 224 from other application variants 108A-108C of the application variants 108A-108C, restoring the application variants 108A-108C to a known good operating state.

The method 900 can further include generating, by signature generation circuitry 702, for each input 104 corresponding to a detected inequality in the execution data 224 of the application variants 108A-108C, a unique signature based on the input 104. The method 900 can further include storing the unique signature in a signature database 712. The method 900 can further include, before receiving the input, generating a second signature 710 based on the input 104. The method 900 can further include comparing the second signature 710 to signatures of the signature database 712. The method 900 can further include, in response to determining that the second signature 710 equals a signature of the signatures, discarding the input before the input is provided to the processing circuitry. The method 900 can further include providing the input to the processing circuitry in response to determine that the second signature does not equal any signature of the signatures.

Electronic Apparatus and System

Example embodiments may be implemented in digital electronic circuitry, or in computer hardware, firmware, software, or in combinations of them. Example embodiments may be implemented using a computer program product (e.g., a computer program tangibly embodied in an information carrier, such as a machine-readable medium for execution by, or to control the operation of, data processing apparatus, such as a programmable processor, a computer, or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry (e.g., a field programmable gate array (FPGA) or an application-specific integrated circuit (ASIC)).

The computing system may include clients and servers. A client and server are generally remote from each other and typically interact through a communication network. The relationship of client and server arises by computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 10:
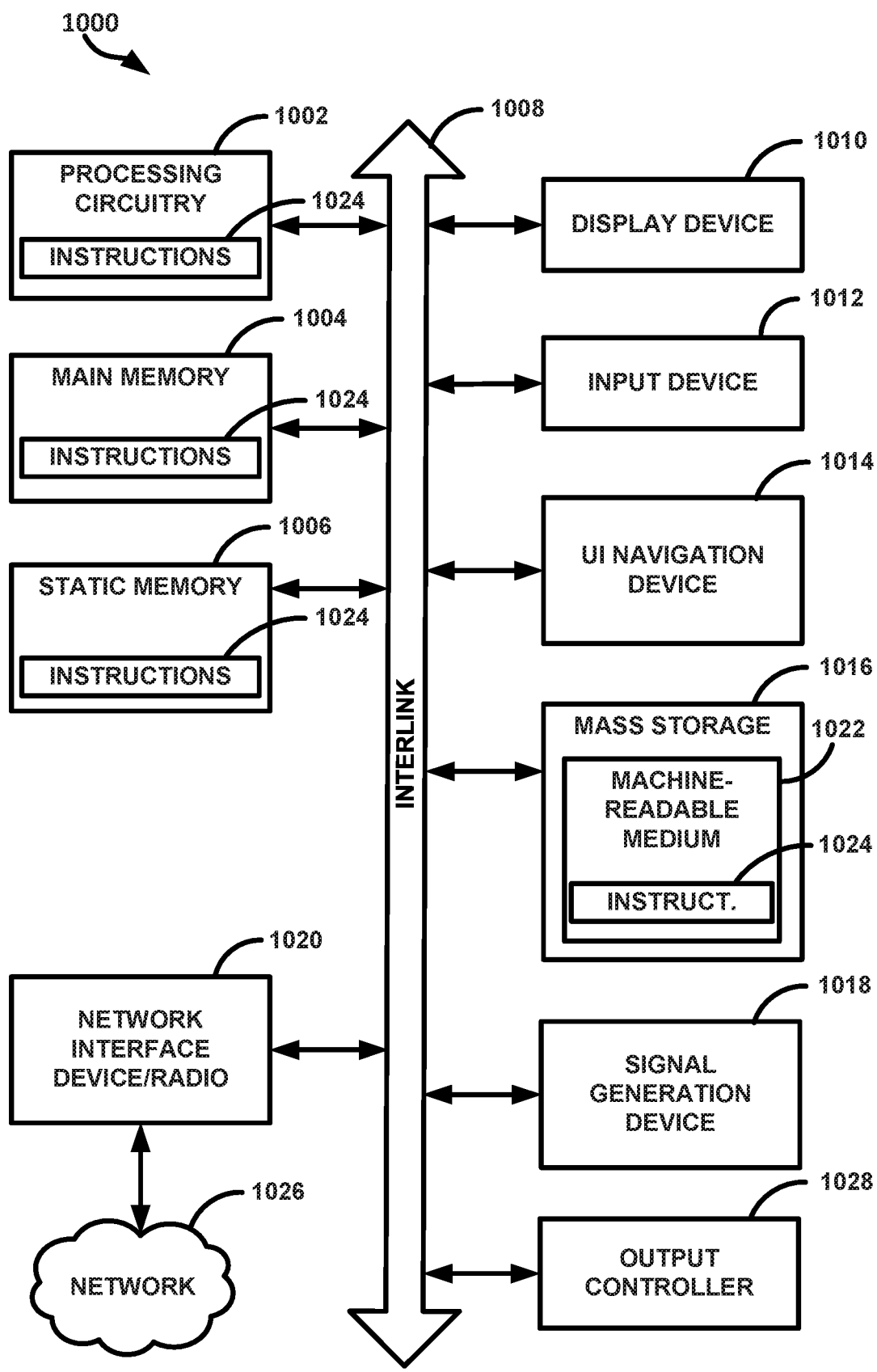
FIG. 10 illustrates, by way of example, a block diagram of an embodiment of a machine in the example form of a computer system within which instructions, for causing the machine to perform any one or more of the methodologies discussed herein, may be executed.

FIG. 10 illustrates, by way of example, a block diagram of an embodiment of a machine in the example form of a computer system 1000 within which instructions, for causing the machine to perform any one or more of the methods discussed herein, may be executed. In one or more embodiments, the application/device 102, the synchronizer 106, the buffer 105, the replicator 116, the control circuitry 118, the application variants 108, the monitor 114, the processor trace hardware 220, the monitor/synchronizer 550, the signature creation system 702, the input verification system 704, or other item discussed herein can be implemented using or include one or more items of the system 1000.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UT) navigation device 1014 (e.g., a mouse), a disk drive unit 1016, a signal generation device 1018 (e.g., a speaker), a network interface device/radio 1020, such as Bluetooth, WWAN, WLAN, and NFC, permitting the application of security controls on such protocols.

Machine-Readable Medium

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004, the static memory 1006, and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., hypertext transfer protocol (HTTP), such as HTTP secure (HTTPS)). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

ADDITIONAL NOTES AND EXAMPLES

Example 1 can include a system for cyber resilient application execution, the system comprising one or more memory devices including a plurality of instruction sets corresponding to respective application variants stored thereon, one of the application variants which may include one or more of an unmodified version of an application, and one or more of the application variants including a modified version of the application, the modified version of the application including the application altered to be resistant to a specified type of cyberattack, processing circuitry to execute the application variants based on a same input, and generate an output, and a monitor to compare output from each of the application variants, and in response to detecting that the output from an application variant of the application variants is not equal to the output from other application variants of the application variants, (1) executing a time delayed version of the application variants or (2) restoring the application variants to a known good operating state.

In Example 2, Example 1 can further include processor trace circuitry to monitor instructions executed by the processing circuitry and generate, for each of the application variants, execution data including one or more of (1) a branch trace sequence indicating consecutive branches and whether the branches were taken, (2) a function sequence indicating consecutive function calls, and (3) a functional sequence indicating consecutive application states, and wherein the monitor is further to receive the execution data and further compare the execution data corresponding to each of the application variants, and in response to detecting that the execution data from an application variant of the application variants is not equal to the execution data from other application variants of the application variants, (1) executing a time delayed version of the application variants or (2) restoring the application variants to a known good operating state.

In Example 3, Example 2 can further include, wherein the execution data includes the branch trace sequence indicating consecutive branches and whether the branches were taken.

In Example 4, at least one of Examples 2-3 can further include, wherein the execution data includes the function sequence indicating consecutive function calls.

In Example 5, at least one of Examples 2-4 can further include, wherein the execution data includes the functional sequence indicating consecutive application states.

In Example 6, at least one of Examples 2-5 can further include, wherein the monitor is to, in response to detecting that the execution data from the application variant of the application variants is not equal to the execution data from other application variants of the application variants, execute the time delayed version of the application variants.

In Example 7, at least one of Examples 2-6 can further include, wherein the monitor is to, in response to detecting that the execution data from the application variant of the application variants is not equal to the execution data from other application variants of the application variants, restore the application variants to a known good operating state.

In Example 8, at least one of Examples 1-7 can further include signature generation circuitry to create, for each input corresponding to a detected inequality in the output of the application variants, a unique signature based on the input, and a signature database to store the unique signature.

In Example 9, Example 8 can further include, wherein the signature generation circuitry is further to, before the processing circuitry receives the input, generate a second signature based on the input, and the monitor is to compare the second signature to signatures of the signature database and, in response to determining that the second signature equals a signature of the signatures, discarding the input before the input is provided to the processing circuitry, and provide the input to the processing circuitry in response to determine that the second signature does not equal any signature of the signatures.

Example 10 includes at least one non-transitory machine-readable medium including instructions that, when executed by processing circuitry, cause the processing circuitry to perform operations comprising comparing output from each of a plurality application variants generated in response to a same input, one of the application variants including an unmodified version of an application, and one or more of the application variants including a modified version of the application, the modified version of the application including the application altered to be resistant to a specified type of cyberattack, and in response to detecting that the output from an application variant of the application variants is not equal to the output from other application variants of the application variants, causing one or more of (1) execution of a time delayed version of the application variants or (2) restoration of the application variants to a known good operating state.

In Example 11, Example 10 can further include, wherein the operations further comprise receiving execution data including one or more of (1) a branch trace sequence indicating consecutive branches and whether the branches were taken by the application variants, (2) a function sequence indicating consecutive function calls by the application variants, and (3) a functional sequence indicating consecutive application states of the application variants, and comparing the execution data corresponding to each of the application variants, and in response to detecting that the execution data from an application variant of the application variants is not equal to the execution data from other application variants of the application variants, (1) executing a time delayed version of the application variants or (2) restoring the application variants to a known good operating state.

In Example 12, Example 11 can further include, wherein the execution data includes the branch trace sequence indicating consecutive branches and whether the branches were taken.

In Example 13, Example 11-12 can further include, wherein the execution data includes the function sequence indicating consecutive function calls.

In Example 14, at least one of Examples 11-13 can further include, wherein the execution data includes the functional sequence indicating consecutive application states.

In Example 15, at least one of Examples 11-14 can further include, wherein, in response to detecting the execution data from the application variant of the application variants is not equal to the execution data from other application variants of the application variants, the operations include executing the time delayed version of the application variants.

Example 16 can include a method for cyber resilient application execution, the method comprising executing application variants based on a same input, one of the application variants including an unmodified version of an application, and one or more of the application variants including a modified version of the application, the modified version of the application including the application altered to be resistant to a specified type of cyberattack, receiving, from processor trace circuitry, execution data including one or more of (1) a branch trace sequence indicating consecutive branches and whether the branches were taken, (2) a function sequence indicating consecutive function calls, and (3) a functional sequence indicating consecutive application states, comparing the execution data corresponding to each of the application variants, and in response to detecting that the execution data from an application variant of the application variants is not equal to the execution data from other application variants of the application variants, (1) executing a time delayed version of the application variants or (2) restoring the application variants to a known good operating state.

In Example 17, Example 16 can further include, wherein the execution data includes the branch trace sequence indicating consecutive branches and whether the branches were taken.

In Example 18, at least one of Examples 16-17 can further include, wherein the execution data includes the function sequence indicating consecutive function calls.

In Example 19, at least one of Examples 16-18 can further include, wherein the execution data includes the functional sequence indicating consecutive application states.

In Example 20, at least one of Examples 16-19 can further include, wherein, in response to detecting that the execution data from the application variant of the application variants is not equal to the execution data from other application variants of the application variants, the method includes restoring the application variants to a known good operating state.

In Example 21, at least one of Examples 16-20 can further include generating, by signature generation circuitry, for each input corresponding to a detected inequality in the execution data of the application variants, a unique signature based on the input, and storing the unique signature in a signature database.

In Example 22, Example 21 can further include before receiving the input, generating a second signature based on the input, comparing the second signature to signatures of the signature database, in response to determining that the second signature equals a signature of the signatures, discarding the input before the input is provided to the processing circuitry, and providing the input to the processing circuitry in response to determine that the second signature does not equal any signature of the signatures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system for cyber resilient application execution, the system comprising:
　　one or more memory devices including a plurality of instruction sets corresponding to respective application variants stored thereon, one of the application variants including an unmodified version of an application, one of the application variants including a modified version of the application, the modified version of the application including the application altered to be resistant to a specified type of cyberattack;
　　processing circuitry to execute the application variants based on a same input, and generate an output
　　a monitor to compare output from each of the application variants, and in response to detecting that the output from an application variant of the application variants is not equal to the output from one or more other application variants of the application variants, executing a time delayed version of the application variants in place of the application variants;

signature generation circuitry to:
create, for each input corresponding to a detected inequality in the output of the application variants, a unique signature based on the input; and
before the processing circuitry receives the input, generate a second signature based on the input; and
a signature database to store the unique signature;
wherein the monitor is to compare the second signature to signatures of the signature database and, in response to determining that the second signature equals a signature of the signatures, discarding the input before the input is provided to the processing circuitry, and provide the input to the processing circuitry in response to determine that the second signature does not equal any signature of the signatures.

2. The system of claim 1, further comprising:
processor trace circuitry to monitor instructions executed by the processing circuitry and generate, for each of the application variants, execution data including one or more of (1) a branch trace sequence indicating consecutive branches and whether the branches were taken, (2) a function sequence indicating consecutive function calls, and (3) a functional sequence indicating consecutive application states; and
wherein the monitor is further to receive the execution data and further compare the execution data corresponding to each of the application variants, and in response to detecting that the execution data from an application variant of the application variants is not equal to the execution data from other application variants of the application variants, (1) executing a time delayed version of the application variants or (2) restoring the application variants to a known good operating state.

3. The system of claim 2, wherein the execution data includes the branch trace sequence indicating consecutive branches and whether the branches were taken.

4. The system of claim 2, wherein the execution data includes the function sequence indicating consecutive function calls.

5. The system of claim 2, wherein the execution data includes the functional sequence indicating consecutive application states.

6. The system of claim 2, wherein the monitor is to, in response to detecting that the execution data from the application variant of the application variants is not equal to the execution data from other application variants of the application variants, execute the time delayed version of the application variants.

7. The system of claim 2, wherein the monitor is to, in response to detecting that the execution data from the application variant of the application variants is not equal to the execution data from other application variants of the application variants, restore the application variants to a known good operating state.

8. At least one non-transitory machine-readable medium including instructions that, when executed by processing circuitry, cause the processing circuitry to perform operations comprising:
executing a plurality of application variants based on a same input;
comparing output from each of the plurality of application variants generated in response to a same input, one of the application variants including an unmodified version of an application, and one or more of the application variants including a modified version of the application, the modified version of the application including the application altered to be resistant to a specified type of cyberattack;
in response to detecting that the output from an application variant of the application variants is not equal to the output from other application variants of the application variants, causing execution of time delayed versions of the application variants in place of the application variants;
receiving execution data including one or more of (1) a branch trace sequence indicating consecutive branches and whether the branches were taken, (2) a function sequence indicating consecutive function calls, and (3) a functional sequence indicating consecutive application states;
comparing the execution data corresponding to each of the application variants;
in response to detecting that the execution data from an application variant of the application variants is not equal to the execution data from other application variants of the application variants, determining the input corresponding to a malicious input and executing a time delayed version of the application variants;
generating, by signature generation circuitry, for each input corresponding to a detected inequality in the execution data of the application variants, a unique signature based on the input;
storing the unique signature in a signature database;
before receiving the input, generating a second signature based on the input;
comparing the second signature to signatures of the signature database;
in response to determining that the second signature equals a signature of the signatures, discarding the input before the input is provided to the processing circuitry; and
providing the input to the processing circuitry in response to determine that the second signature does not equal any signature of the signatures.

9. The non-transitory machine-readable medium of claim 8, wherein the execution data includes the branch trace sequence indicating consecutive branches and whether the branches were taken.

10. The non-transitory machine-readable medium of claim 8, wherein the execution data includes the function sequence indicating consecutive function calls.

11. The non-transitory machine-readable medium of claim 8, wherein the execution data includes the functional sequence indicating consecutive application states.

12. The non-transitory machine-readable medium of claim 8, wherein, in response to detecting the execution data from the application variant of the application variants is not equal to the execution data from other application variants of the application variants, the operations include executing the time delayed version of the application variants.

13. A method for cyber resilient application execution, the method comprising:
executing application variants based on a same input, one of the application variants including a modified version of the application, the modified version of the application including the application altered to be resistant to a specified type of cyberattack;
receiving, from processor trace circuitry, execution data including one or more of (1) a branch trace sequence indicating consecutive branches and whether the branches were taken, (2) a function sequence indicating consecutive function calls, and (3) a functional sequence indicating consecutive application states;

comparing the execution data corresponding to each of the application variants;

in response to detecting that the execution data from an application variant of the application variants is not equal to the execution data from other application variants of the application variants, determining the input corresponding to a malicious input and executing a time delayed version of the application variants;

generating, by signature generation circuitry, for each input corresponding to a detected inequality in the execution data of the application variants, a unique signature based on the input;

storing the unique signature in a signature database;

before receiving the input, generating a second signature based on the input;

comparing the second signature to signatures of the signature database;

in response to determining that the second signature equals a signature of the signatures, discarding the input before the input is provided to the processing circuitry; and providing the input to the processing circuitry in response to determine that the second signature does not equal any signature of the signatures.

14. The method of claim 13, wherein the execution data includes the branch trace sequence indicating consecutive branches and whether the branches were taken.

15. The method of claim 13, wherein the execution data includes the function sequence indicating consecutive function calls.

16. The method of claim 13, wherein the execution data includes the functional sequence indicating consecutive application states.

17. The method of claim 13, wherein, in response to detecting that the execution data from the application variant of the application variants is not equal to the execution data from other application variants of the application variants, the method includes restoring the application variants to a known good operating state.

* * * * *